United States Patent
Tucker

(10) Patent No.: US 11,025,695 B2
(45) Date of Patent: *Jun. 1, 2021

(54) TECHNIQUES FOR MODIFYING A RULES ENGINE IN A HIGHLY-SCALED COMPUTING ENVIRONMENT

(71) Applicant: NETFLIX Corporation, Los Gatos, CA (US)

(72) Inventor: Haley Tucker, Mountain View, CA (US)

(73) Assignee: NETFLIX, INC., Los Gatos, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/901,923

(22) Filed: Jun. 15, 2020

(65) Prior Publication Data

US 2020/0314162 A1 Oct. 1, 2020

Related U.S. Application Data

(63) Continuation of application No. 15/337,277, filed on Oct. 28, 2016, now Pat. No. 10,693,933.

(60) Provisional application No. 62/248,219, filed on Oct. 29, 2015.

(51) Int. Cl.
*H04L 29/06* (2006.01)
*H04L 12/58* (2006.01)

(52) U.S. Cl.
CPC ............ *H04L 65/602* (2013.01); *H04L 51/06* (2013.01); *H04L 65/4069* (2013.01); *H04L 65/4092* (2013.01)

(58) Field of Classification Search
CPC . H04L 51/06; H04L 65/4069; H04L 65/4092; H04L 65/602; H04L 65/605; H04L 67/02; H04L 67/22; H04L 21/2187; H04L 21/2353; H04L 21/4828; G06F 21/10; G06F 21/604; G06F 40/226; G06F 9/546; G06Q 10/107; G06Q 30/0269
See application file for complete search history.

(56) References Cited

U.S. PATENT DOCUMENTS

| | | | |
|---|---|---|---|
| 8,490,133 B1 * | 7/2013 | Parekh | H04N 21/2353 725/44 |
| 2007/0118873 A1 * | 5/2007 | Houh | H04N 21/4828 725/136 |
| 2007/0156726 A1 * | 7/2007 | Levy | G06F 21/10 |
| 2010/0125450 A1 * | 5/2010 | Michaelangelo | G06F 40/226 704/9 |

(Continued)

*Primary Examiner* — Le H Luu
(74) *Attorney, Agent, or Firm* — Arteqis Law Group, LLP

(57) ABSTRACT

One embodiment of the present invention sets forth a technique for modifying a rules engine implemented in a highly-scaled computing environment. The technique includes receiving rules data that include a first operation, wherein the first operation is from a set of pre-defined operations and includes at least one dimension that is from a set of pre-defined dimensions and building a list of rules based on the rules data, wherein the list of rules filters an extended list of entries based on the first operation and on a first value that corresponds to the at least one dimension. The technique further includes receiving a request to generate a filtered list of entries, wherein the request references the first value, and, in response to receiving the request, applying the list of rules to the extended list of entries based on the first value to generate the filtered list of entries.

30 Claims, 8 Drawing Sheets

(56) References Cited

U.S. PATENT DOCUMENTS

| | | | |
|---|---|---|---|
| 2013/0297604 A1* | 11/2013 | Sutedja | G06Q 10/107 707/737 |
| 2014/0032691 A1* | 1/2014 | Barton | G06F 21/604 709/206 |
| 2014/0372591 A1* | 12/2014 | Payette | H04L 65/605 709/223 |
| 2015/0154643 A1* | 6/2015 | Artman | G06Q 30/0269 705/14.66 |
| 2015/0172605 A1* | 6/2015 | Anwar | H04N 21/2187 348/159 |
| 2016/0004578 A1* | 1/2016 | Selig, IV | G06F 9/546 719/313 |
| 2016/0065637 A1* | 3/2016 | O'Malley | H04L 67/22 709/231 |
| 2017/0060857 A1* | 3/2017 | Imbruce | H04L 67/02 |

\* cited by examiner

TECHNIQUES FOR MODIFYING A RULES ENGINE IN A HIGHLY-SCALED COMPUTING ENVIRONMENT

CROSS-REFERENCE TO RELATED APPLICATIONS

This application is a continuation of U.S. patent application titled, "TECHNIQUES FOR MODIFYING A RULES ENGINE IN A HIGHLY-SCALED COMPUTING ENVIRONMENT," filed Oct. 28, 2016 and having Ser. No. 15/337,277, which claims the benefit of U.S. provisional application titled, "APPROACH FOR DELIVERING INTERNET-BASED SERVICES AND CONTENT," filed on Oct. 29, 2015 and having Ser. No. 62/248,219. The subject matter of these related applications is hereby incorporated herein by reference.

BACKGROUND OF THE INVENTION

Field of the Invention

The present invention relates generally to computer science and, more specifically, to techniques for modifying a rules engine in a highly-scaled computing environment.

Description of the Related Art

Online streaming services for video programs (e.g., movies and episodes of television shows) typically provide various audio, video, and text streams associated with each program that is available for streaming. For example, for a particular program, an online streaming service may have multiple audio streams that can be transmitted to an end user, such as a 5.1 surround sound audio stream, a stereo audio stream, and a mono audio stream. Similarly, for the same program, the online streaming service typically has various video streams that can be transmitted to the end user, such as a different video stream for each resolution and/or bit rate. In addition, various text streams may also be available for transmission to the end user, such as different classes of subtitles.

For an optimal viewing experience of a requested program, online streaming services generally provides multiple data streams to an end user, including an audio stream, a video stream, and a text stream. The total number of different possible multiplexed data streams that can be transmitted to an end user for the requested movie or television program may be in the hundreds or thousands, particularly when some of the data streams that can be provided are multiplexed data streams. For example, when an online streaming service provides multiplexed audio and video streams, there may be a very large number of such multiplexed data streams that have been encoded for a particular program, i.e., one for each possible combination of the different audio and video streams that are available for the requested program.

One problem with the above approach is that many of the possible data streams associated with a requested program may not be compatible with the endpoint viewing device from which the request originates. For example, many endpoint viewing devices are not capable of displaying high-definition videos or may have problems receiving data streams of a certain bit rate. In addition, numerous other factors may influence what data streams associated with a requested program are actually compatible with a particular endpoint viewing device, including customer subscription status, the licensing rights of the requested program for the country in which the requesting device resides, and other similar factors. Importantly, when a data stream is incompatible with an endpoint viewing device to which the data stream is transmitted, a poor viewing experience results because the data stream functions either poorly or not at all. Consequently, one challenge for online streaming services is to accurately determine what available data streams are compatible with a particular endpoint viewing device when a program is requested by that endpoint viewing device.

Another related complication is that many of the parameters affecting data stream compatibility change frequently, such as customer subscription status, licensing rights within particular countries, and other like parameters. Similarly, the list of specific endpoint viewing devices that are known to have compatibility issues with a particular class or with particular classes of data streams can change on an almost daily basis as well. Thus, algorithms or rules engines employed to determine which data streams for which programs are compatible with particular endpoint viewing devices must necessarily be updated frequently.

Because online streaming services are oftentimes implemented via highly scaled computing environments, with hundreds or thousands of servers located worldwide, implementing frequent changes to applications residing on those servers, such as rules engines, is quite problematic. In particular, modifying these types of applications typically requires changing and testing of the code associated with the application, deploying new code to each impacted server, and restarting the modified application. Alternatively, a manual or scripted login and configuration change can be performed on each individual server on which the application resides. Either approach can be time-consuming and error prone, taking hours to complete. Furthermore, because newly modified code is deployed throughout the online streaming environment, every possible endpoint viewing device is exposed to the output of the new code without testing, which substantially increases the risk of endpoint incompatibility problems.

As the foregoing illustrates, what is needed in the art are more effective approaches for implementing modifications to rules engines that are deployed in a highly-scaled computing environments.

SUMMARY OF THE INVENTION

One embodiment of the present invention sets forth a technique for modifying a rules engine implemented in a highly-scaled computing environment. The technique includes receiving rules data that include a first operation, wherein the first operation is from a set of pre-defined operations and includes at least one dimension that is from a set of pre-defined dimensions and building a list of rules based on the rules data, wherein the list of rules filters an extended list of entries based on the first operation and on a first value that corresponds to the at least one dimension. The technique further includes receiving a request to generate a filtered list of entries, wherein the request references the first value, and, in response to receiving the request, applying the list of rules to the extended list of entries based on the first value to generate the filtered list of entries.

At least one advantage of the disclosed techniques is that a rules engine employed in a plurality of computing devices can be modified without rebooting the computing devices or restarting an application that calls or includes the rules engine.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
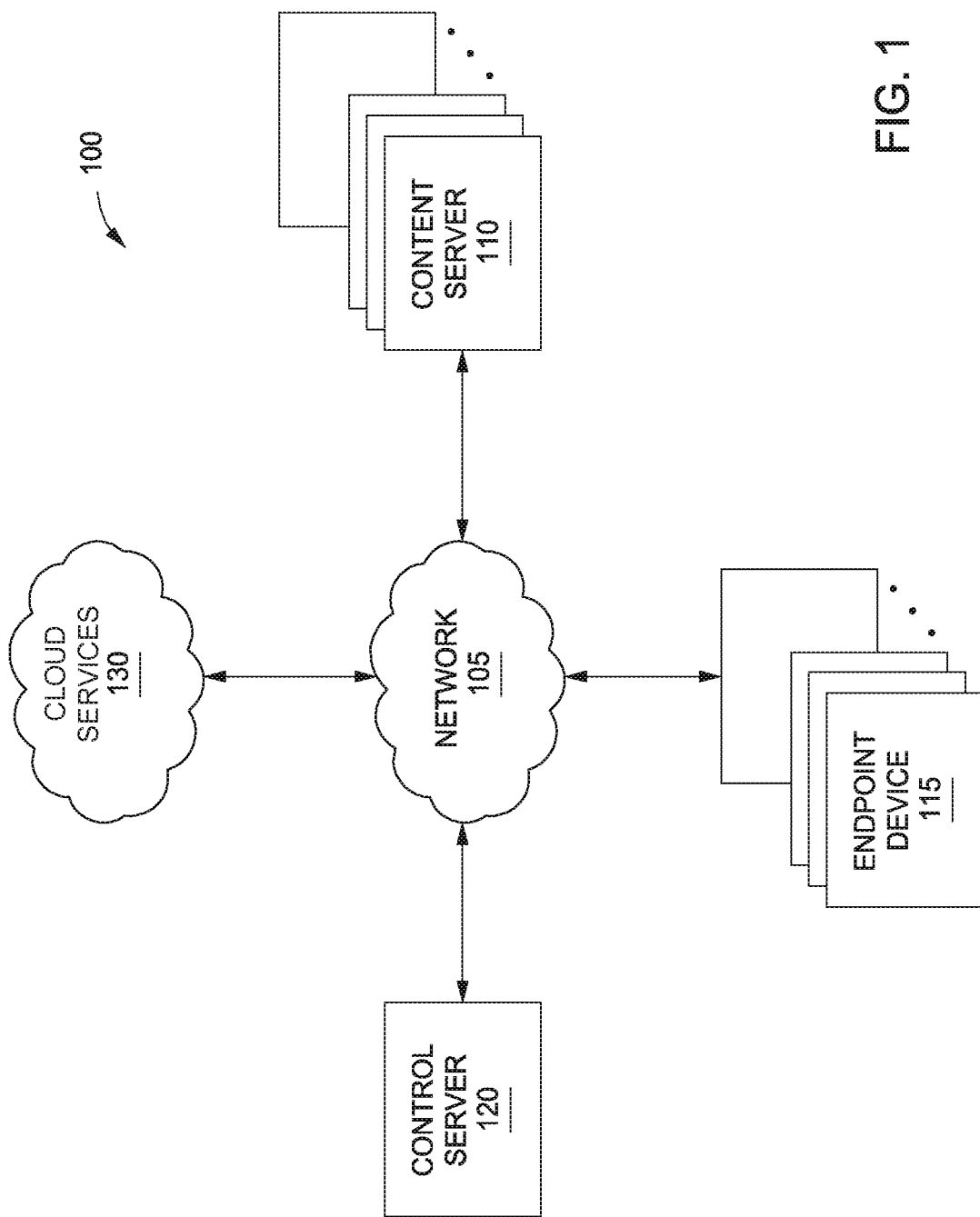
FIG. 1 illustrates a network infrastructure used to distribute content to content servers and endpoint devices, according to various embodiments of the present invention.

FIG. 1 illustrates a network infrastructure 100 used to distribute content to content servers 110 and endpoint devices 115, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
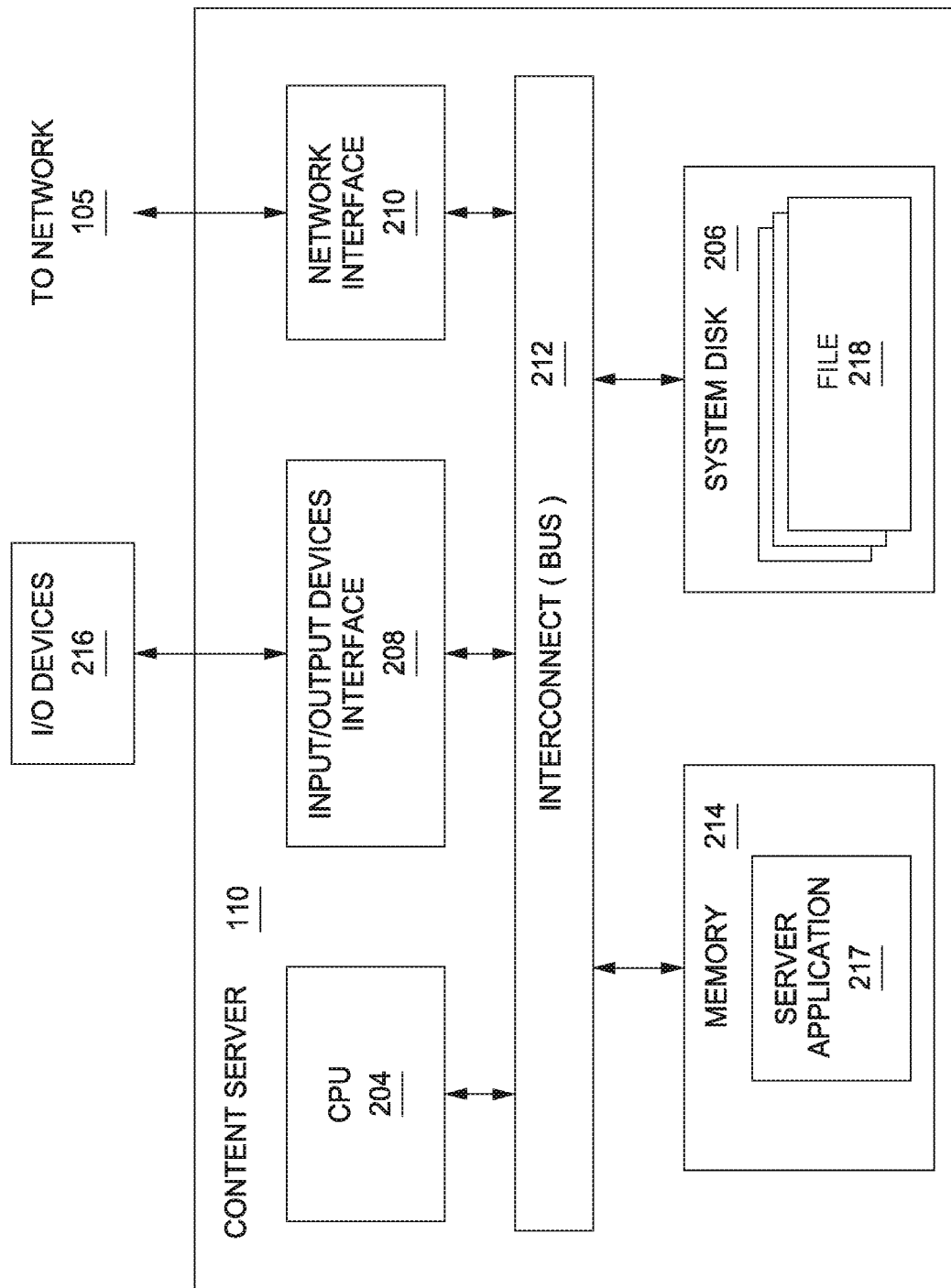
FIG. 2 is a block diagram of a content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In some embodiments, files 218 include data streams and multiplexed data streams associated with a particular video program, such as a television show episode or movie. In such embodiments, a multiplexed data stream associated with a program may include a video data stream and an audio data stream, and a plurality of such multiplexed data streams may be associated with a single program. For example, in an embodiment, a first multiplexed data stream associated with a particular program includes a video data stream at a first resolution (e.g., one of 1080p, 720p, or 480p) and a first bit rate, and an audio data stream that provides 5.1 audio. A second multiplexed data stream associated with the same program includes a video data stream at a second resolution but the same audio data steam as the first multiplexed data stream; a third multiplexed data stream associated with the same program includes a video data stream at a third resolution but the same audio data steam as the first multiplexed data stream, and so on. Thus, in a simple example in which, for a particular program, three different resolutions, two different bit rates, and three audio data streams are available, files 218 may include as many as 18 different multiplexed data streams that can be requested from an endpoint viewing device. In some embodiments, each available data stream, including each possible multiplexed data stream, may be associated with a unique address or other identifier, such as a Uniform Resource Locator (URL).

Figure 3:
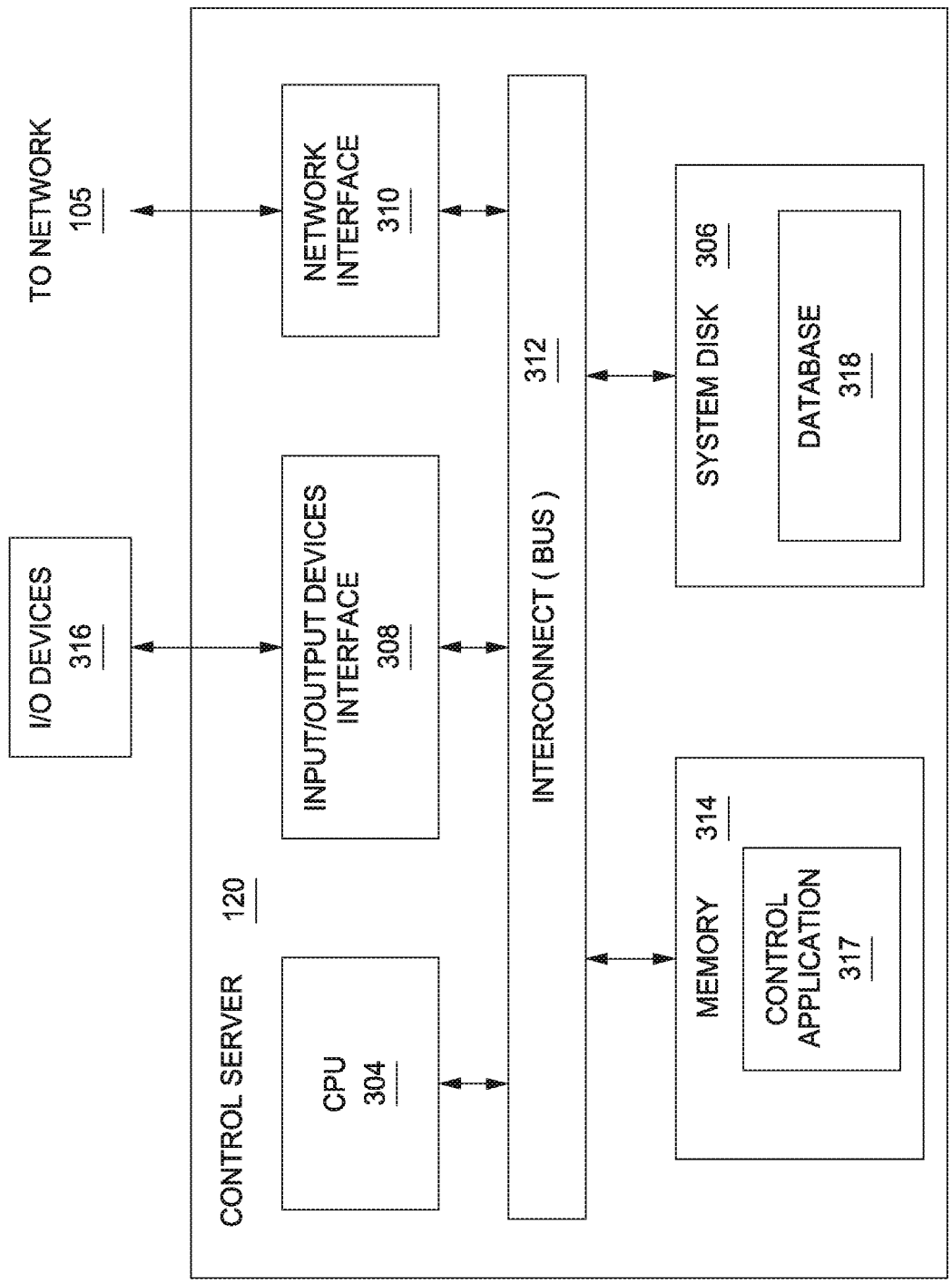
FIG. 3 is a block diagram of a control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115. As noted above, in some embodiments, URL's and/or other metadata associated with files 218 in FIG. 2 may be stored in database 318.

Figure 4:
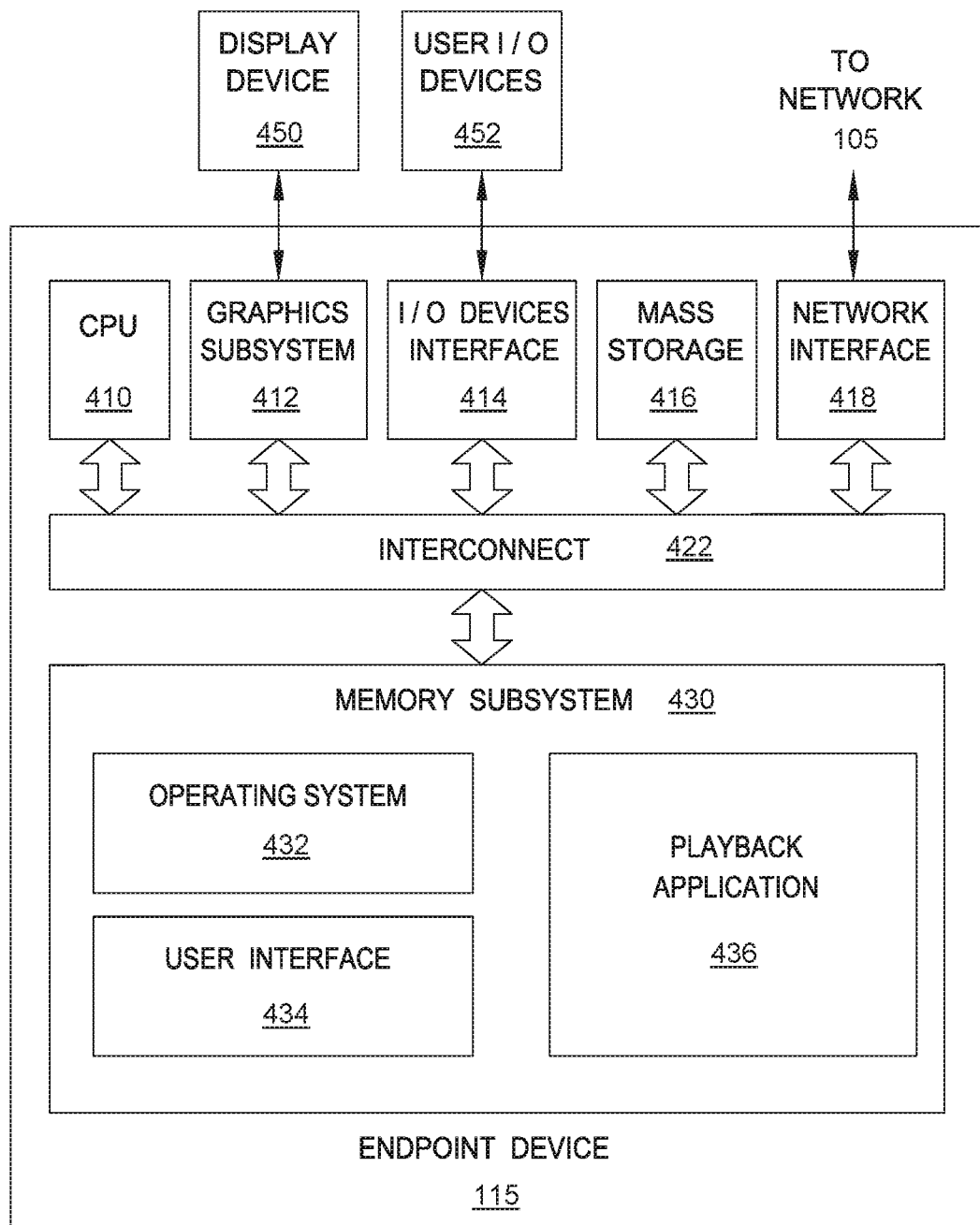
FIG. 4 is a block diagram of an endpoint device that may be implemented in conjunction with the network infrastructure of FIG. 1, according to various embodiments of the present invention.

FIG. 4 is a block diagram of an endpoint device 115 that may be implemented in conjunction with the network infrastructure 100 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request and receive content from the content server 110 via the network interface 418. Further, the playback application 436 is configured to interpret the content and present the content via display device 450 and/or user I/O devices 452. Such content may include one or more data streams (and/or one or more multiplexed data streams) that are associated with requested content from content server 110, such as a video program.

Playback Manifest Generation System

According to various embodiments of the invention, a rules engine included in or called by an application or service is modified via a configuration change that can be implemented without a restart of the application or service. Thus, in a highly-scaled computing environment, modification to the rules engine can be implemented in the many instances of the application or service in the computing environment without the adverse impact of restarting each instance of the application or service. Specifically, changes to the rules engine are implemented by pushing updated data that are employed by the rules engine to the many computing devices on which the application or service is running. By contrast, implementing changes to the rules engine by pushing new code for the application or service to these many computing devices generally requires compiling and restarting of the application or service.

In some embodiments, a rules engine is associated with a playback manifest generation application that runs on a plurality of servers in a highly-scaled computing environment. In such embodiments, in response to a request from an endpoint device for video content, the playback manifest generation application generates and provides a playback manifest to the endpoint device that identifies one or more data streams that are compatible with the endpoint device from which the request originated. For example, a playback manifest may be a document or file containing a list of streams and relevant metadata for enabling a device to play rich video content in a streaming fashion. Thus, in such embodiments, when an end user requests video content via an endpoint device and receives a suitable playback manifest, the end user can select one or more data streams that provide the requested video content and are known to be compatible with the endpoint device. For example, video, audio, and closed-captioning options can be selected by the end user via the endpoint device based on what video, audio, and/or text data streams are determined by the rules to be compatible with the endpoint device.

Figure 5:
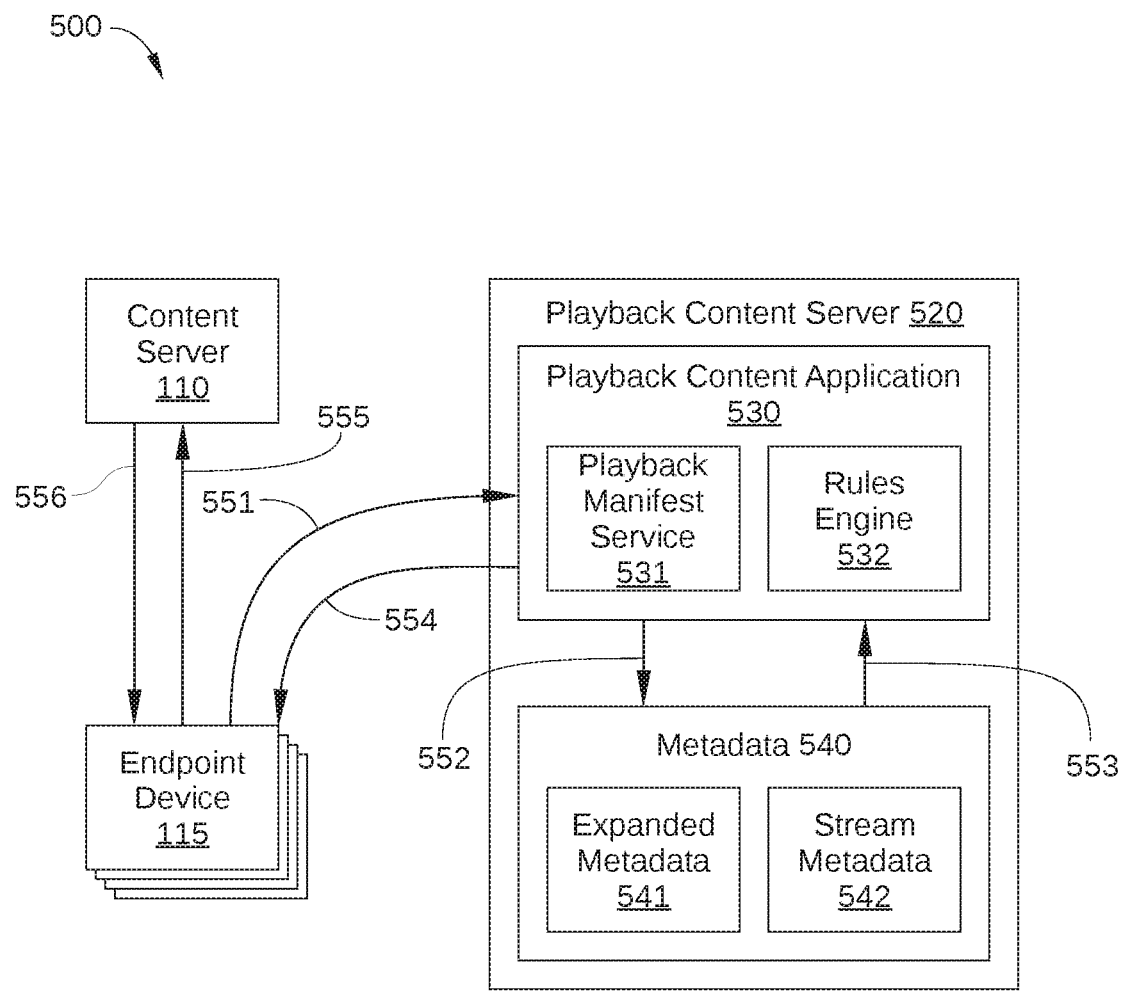
FIG. 5 illustrates a playback manifest generation system that can be implemented in conjunction with the network infrastructure of FIG. 1, according to various embodiments of the present invention.

FIG. 5 illustrates a playback manifest generation system 500 that can be implemented in conjunction with the network infrastructure of FIG. 1, according to various embodiments of the present invention. Playback manifest generation system 500 is configured to generate and provide a playback manifest to an endpoint device 115 in response to a request for video content from the endpoint device 115. To that end, playback manifest generation system includes a plurality of endpoint devices 115 (described above in conjunction with FIG. 4), one or more content servers 110 (described above in conjunction with FIG. 2), and one or more playback content servers 520.

The number of endpoint devices 115 that may make the herein described requests for video content is generally very large, for example on the order of thousands or millions. Due to the large number of geographically disparate endpoint devices 115 that may potentially make such requests, playback manifest generation system 500 may generate and provide a suitable playback manifest via any of a plurality of playback content servers 520. For clarity, only a single playback content server 520 and a plurality of endpoint devices 115 that are geographically proximate to this particular playback content server 520 are depicted in FIG. 5.

Playback content server 520 is configured to receive video content requests 551 from endpoint devices 115, generate a suitable playback manifest 554, and transmit the playback manifest 554 to the requesting endpoint device 115. In some embodiments, playback content server 520 is implemented as a server machine or other computing device that executes a playback content application 530. In addition, in some embodiments, playback content server 520 stores metadata 540, which includes expanded metadata 541 and stream metadata 542.

Playback content application 530 includes one or more services, such as a playback manifest service 531 and a rules engine 532. Playback manifest service 531 is configured to determine what data streams associated with a particular video program are compatible with an endpoint device 115 from which a video content request 551 for the particular video program has originated. Playback manifest service 531 is configured to make such a determination based on request metadata included in the video content request 551, expanded metadata 541, and stream metadata 542. Specifically, playback manifest service 531 is configured to call rules engine 532, described below, to make such a determination.

Rules engine 532 is configured to execute one or more business rules in a runtime production environment associated with network infrastructure 100. Rules engines 532 supports rules, preconditions, exclusions, and other functions associated with determining what data streams available in content servers 110 are compatible with a particular video content request 551. In some embodiments, rules engine generates a list of rules for filtering an extended list of entries, such as all data streams associated with a particular video program, to generate a filtered list of entries, such as all data streams that are compatible with an endpoint device 115 associated with the particular video content request 551. In such embodiments, the list of rules in based on one or more operations from a set of pre-defined operations, where each such operation includes at least one dimension from a set of pre-defined dimensions. A dimension may be defined as any useful piece of information or parameter, such as a customer ID parameter, a country ID parameter, a high-definition video capability indicator, a numeric value for indicating a preferred language, and the like.

As a separate construct from playback manifest service 531 and other applications executing on playback content server 520, rule engine 532 enables the operational decisions of what data streams are compatible with a particular video content request 551 to be defined, tested, executed, and maintained separately from application code associated with playback manifest 531 and other applications executing on playback content server 520. According to embodiments of the present invention, dimensions and operations employed by rules engine 532 are stored as data in playback content server 520, and therefore can be updated dynamically without a restart of playback content application 530, playback manifest service 531, or rules engine 532, or a reboot of playback content server 520. The updating of dimensions and operations employed by rules engine 532 is described in greater detail below in conjunction with FIGS. 7 and 8.

Video content request 551 includes metadata for facilitating the streaming of requested video content to a particular endpoint device 115. For example, in some embodiments, such metadata includes values for certain dimensions used by playback manifest service 531 to generate playback manifest 554, such as an identifier for the specific video content requested (program identifier), an identifier for the country in which the particular endpoint device is located (country identifier), an identifier for a customer associated with the request (customer identifier), and an identifier for the model of the particular endpoint device 115 (endpoint device identifier). Thus, in such embodiments, video content request 551 includes values for the following dimensions: requested video content (i.e., video program), country, customer ID, and device ID. Furthermore, in some embodiments, video content request 551 may include additional metadata, such as information indicating manual user inputs made when video content request 551 is generated. For example, in such embodiments, video content request 551 may include a non-default language (for subtitles or closed-captioning), video resolution, or sound quality requested by the end user.

Expanded metadata 541 includes additional dimension values that are not included in video content request 551, but are employed by rules engine 532 to determine what available data streams are compatible with the requesting endpoint device 115. Expanded metadata 541 generally includes additional metadata that are mapped to the dimensions included in video content request 551. Thus, expanded metadata 541 enable rules engine 532 to determine what available data streams are compatible with a requesting endpoint device 115 based on many more dimensions than the small number of dimensions included in video content request 551. For instance, in embodiments in which video content request 551 includes a value for a device ID dimension, expanded metadata 541 includes a plurality of additional dimension values for each possible device ID value, such as what video resolutions are supported by each particular device ID, what data bit rates are supported by each particular device ID, what audio streams are supported by each particular device ID, etc. Similarly, in embodiments in which video content request 551 includes a value for a customer ID dimension, expanded metadata 541 includes a plurality of additional dimension values for each possible customer ID value, such as default settings associated with each particular customer ID, customer account information associated with each particular customer ID, and the like.

Stream metadata 542 includes identifiers for each of the plurality of data streams associated with each video program available in content server 110. As noted above, for a particular video program available in content server 110, there may be a very large number of data streams and/or multiplexed data streams that can provide video content associated with the particular program. For example, given the large number of possible combinations of different video resolution, sound quality, and text-language, and multiplexed data streams that can be formed, there may be several hundred unique data streams available in content server 110 for a single video program. Thus, stream metadata 542 includes a stream identifier for each such data stream. In addition, stream metadata 542 may include other metadata associated with each data streams associated with each video program available in content server 110, such as metadata indicating characteristics of each such data stream (resolution, bit rate, audio stream type, etc.).

Generating a Playback Manifest

In operation, when an end user requests video content via one of endpoint devices 115, playback content server 520 of playback manifest generation system 500 receives video content request 551 from the endpoint device 115. Playback manifest service 531 sends a metadata request 552 for additional metadata based on the metadata included in video content request 551, e.g., requested video content ID, country ID, customer ID, and device ID. Playback manifest service 531 then receives the additional metadata 553, which may include a list of all data streams associated with the particular video program referenced in video content request 551. Further, additional metadata 553 generally includes values for dimensions that are employed by rules engine 532 but are not included in video content request 551, such as capabilities of the endpoint device 115 from which video content request 551 originates, customer settings, country-specific filters, and the like. Playback manifest service 531 then calls rules engine 532 to determine what data streams associated with the requested video content are compatible with endpoint device 115 from which video content request 551 originated. Playback content application 530 then generates a playback manifest 554 and transmits playback manifest 554 to the endpoint device 115 from which video content request 551 originated. Playback manifest 554 generally includes a unique address or other identifier, such as a URL, for each data stream determined by rules engine 532 to be compatible with video content request 551. Based on the one or more URLs included in playback manifest 554, the endpoint device 115 then transmits a request 555 for a particular data stream from content server 110. In response, content server 110 begins streaming the requested video content via one or more data streams 556 as shown.

Playback content server 520 of playback manifest generation system 500 may be implemented as a part of content server 110 in FIG. 2, control server 120 in FIG. 3, and/or on a stand-alone computing device. One such computing device is described below in conjunction with FIG. 6.

Figure 6:
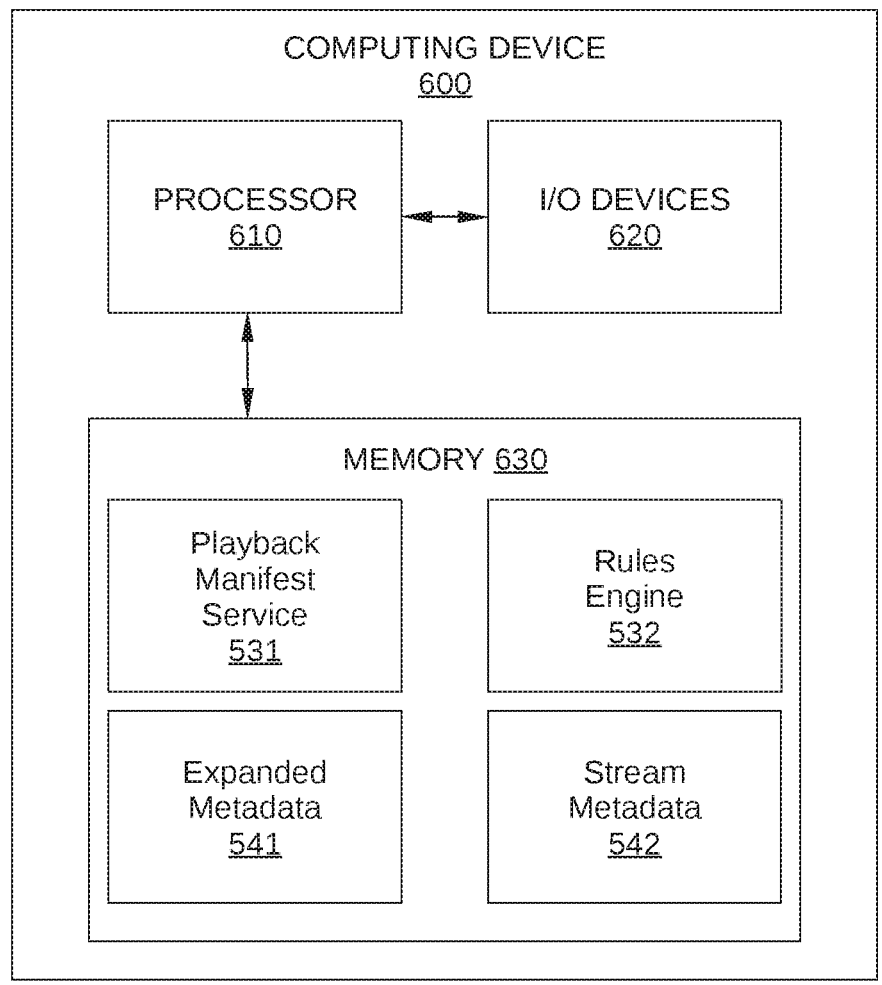
FIG. 6 is a block diagram of a computing device configured to implement various embodiments of the present invention.

FIG. 6 is a block diagram of a computing device 600 configured to implement various embodiments of the present invention. In operation, computing device 600 is configured to generate a playback manifest, transmit the playback manifest to the endpoint device from which a video content request has originated, and dynamically update a rules engine that is called to determine what data streams are indicated in the playback manifest, by executing playback manifest service 531 and/or rules engine 532, according to one or more embodiments of the present invention.

Computing device 600 may be any type of device capable of executing application programs including, without limitation, instructions associated with playback manifest service 531 and/or rules engine 532. For example, and without limitation, computing device 600 may be a laptop, a tablet, a smartphone, etc. In the embodiment illustrated in FIG. 6, computing device 600 includes, without limitation, a processor 610, input/output (I/O) devices 620, and a memory 630.

Processor 610 may be implemented as a central processing unit (CPU), a graphics processing unit (GPU), an ASIC, an FPGA, any other type of processing unit, or a combination of different processing units. Among other things, and without limitation, processor 610 may be any technically feasible hardware unit capable of processing data and/or executing software applications to facilitate execution of playback manifest service 531 and/or rules engine 532, as described herein.

I/O devices 620 may include input devices, output devices, and devices capable of both receiving input (e.g., digital images and text-containing images to be incorporated into the digital images) and providing output (e.g., digital images in which one or more text-containing images have been incorporated). Memory 630 may include a memory module or a collection of memory modules. As shown, in some embodiments, playback manifest service 531 and/or rules engine 532 may reside in memory 630 during operation.

Computing device 600 may be implemented as a stand-alone chip, such as a microprocessor, or as part of a more comprehensive solution that is implemented as an application-specific integrated circuit (ASIC), a system-on-a-chip (SoC), and so forth. Generally, computing device 600 may be configured to coordinate the overall operation of a computer-based system. In other embodiments, computing device 600 may be coupled to, but separate from such a computer-based system. In such embodiments, the computer-based system may include a separate processor that transmits input to computing device 600, such as digital images and text-containing images to be incorporated into the digital images, and receives output from computing device 600, such as digital images in which one or more text-containing images have been incorporated. However, the embodiments disclosed herein contemplate any technically feasible system configured to implement playback manifest service 531 and/or rules engine 532, in any combination.

In alternative embodiments, rather than being configured as a stand-alone machine, computing device 600 may be associated with or included in one or more of content servers 110 and/or control servers 120 in FIG. 1. For example, and without limitation, the functionality of computing device 600 may be incorporated into or implemented by the various processors included within content server 110, shown in FIG. 2 and/or any server or other physical or virtual machine within cloud services 130 in FIG. 1. In such embodiments, playback manifest service 531 and/or rules engine 532 may reside in one or more of content servers 110 and/or control servers 120 during operation.

Modifying Rules Engine of a Playback Manifest Generation System

According to embodiments of the present invention, a rules engine is modified that is included in or called by an application or service executing on a plurality of servers or other computing devices. Specifically, the rules engine is dynamically modified without a restart of the associated service or application or a reboot of the server on which the application or server is executing. Instead, changes to the rules engine are implemented by transporting, as data, updated dimensions and/or operations that are employed by the rules engine to the many computing devices on which the application or service is running. Because such dimensions and/or operations are pre-defined in the calling application or service, new dimensions or operations generally cannot be introduced dynamically in this way, whereas how the rules engine employs such dimensions and/or operations can be modified dynamically. Consequently, in a highly-scaled computing environment, the many instances of a rules engine can be implemented throughout the computing environment without the adverse effect of restarting the many instances of the associated application or rebooting the large number of affected servers.

Figure 7:
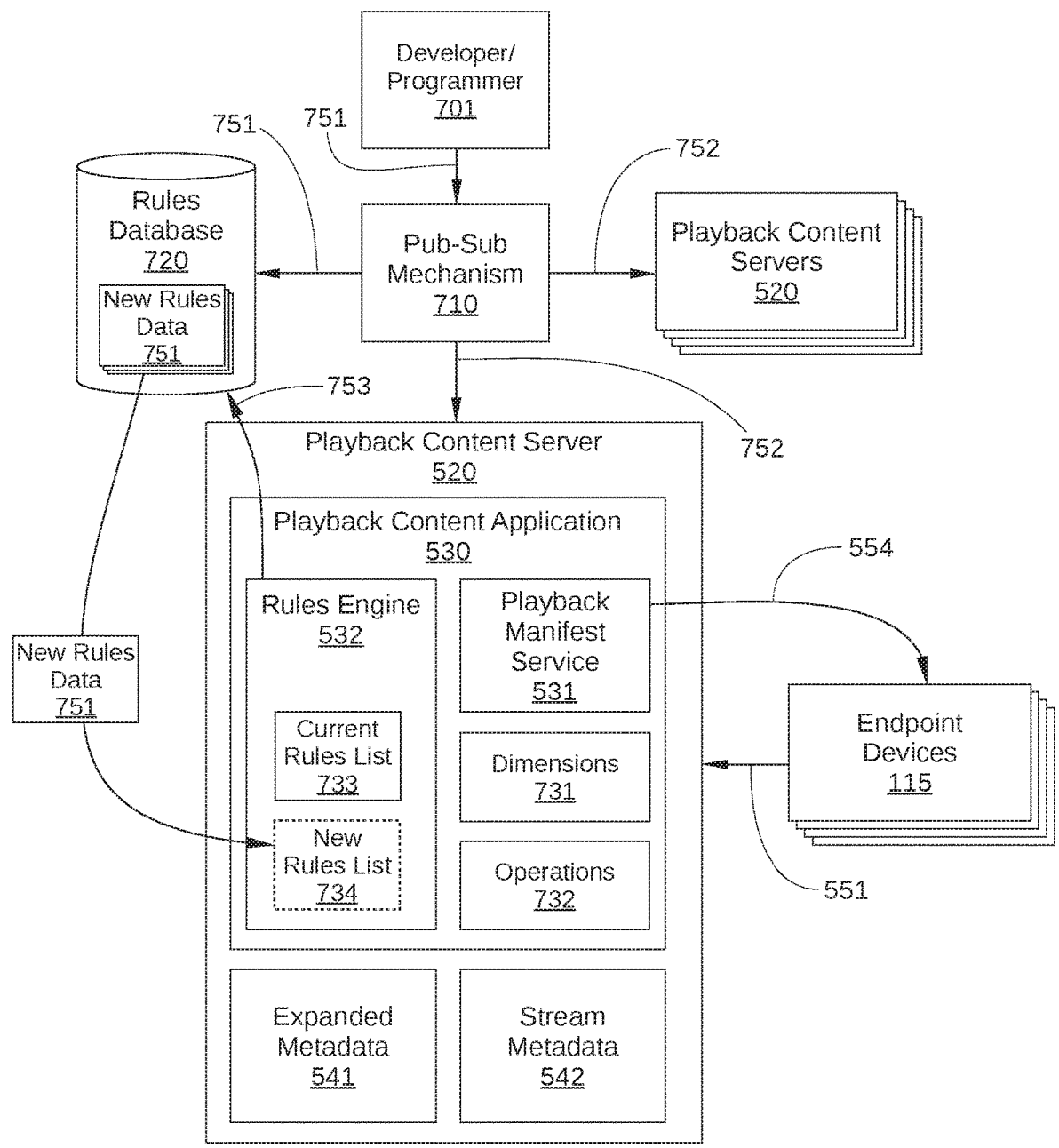
FIG. 7 illustrates a computing environment in which the playback manifest generation system of FIG. 5 may be implemented, according to various embodiments of the present invention.

FIG. 7 illustrates a computing environment 700 in which playback manifest generation system 500 may be implemented, according to various embodiments of the present invention. As shown, computing environment 700 includes a plurality of playback content servers 520, a plurality of endpoint devices 115, a publish-subscribe (pub-sub) mechanism 710, and a rules database 720. Computing environment 700 is configured to enable the dynamic modification of each instance of rules engine 532 that is executing on one of playback content servers 520. For example, when a developer or programmer 701 generates new rules data 751 to be followed by rules engine 532, computing environment 700 is configured to implement these modified rules in each of playback content servers 520.

As shown, playback content application 530 of playback content server 520 includes defined dimensions 731 and defined operations 732, which include the various preconditions, exclusions, and other functions employed in rules engine 532 for determining what data streams available in stream metadata 542 and/or content servers 110 are compatible with a particular video content request 551. It is noted that defined dimensions 731 and defined operations 732 are included in the code of playback content application 530, or alternatively playback manifest service 531 or rules engine 532. Consequently, any new rules data 751 employed by rules engine 532 to generate a new rules list 734 (that replaces a current rules list 733) include pre-defined dimensions 731 and pre-defined operations 732. Conversely, any new rules data 751 employed by rules engine 532 to generate new rules list 734 only include dimensions or operations that are defined in playback server application 530 and/or rules engine 532. That is, new rules data 751 only include dimensions from the set of dimensions defined by dimensions 731 and no other dimensions, and only include operations from the set of operations defined by operations 732 and no other operations.

Alternatively or additionally, in some embodiments, new rules list 734 generated by rules engine 532 may be employed to perform other operations besides filtering. In such embodiments, a rules engine 532 may generate, based on new rules list 734, a whitelist or blacklist, where a particular feature is enabled or disabled for specific customers, endpoint devices 115, etc. Alternatively or additionally, in such embodiments, rules engine 532 may perform a categorization of a particular video content request 551, based on new rules list 734 and one or more dimensions included in the particular video content request 551. In such embodiments, security restrictions and/or other restrictions can be imposed on a particular request via new rules list 734.

Pub-sub mechanism 710 may be any suitable construct configured to enable subscribers, such as playback content servers 520, to register for specific messages. In some embodiments, pub-sub mechanism 710 is configured as a topic-based system, in which messages are published to "topics," i.e., named logical channels or classes of information. In such embodiments, a subscriber receives messages published to the topics to which the subscriber has subscribed, and all subscribers to a topic will receive the same messages. Thus, when a topic recognized by pub-sub mechanism 710 is "rules engine 532," each instance of playback content servers 520 receives a notification message 752 from pub-sub mechanism 710 whenever pub-sub mechanism 710 is notified of new rules data 751 to be implemented by rules engine 532. Alternatively, in some embodiments, playback content servers 520 are configured to periodically poll pub-sub mechanism 710 for new rules data 751. Alternatively, in some embodiments, pub-sub mechanism 710 may be configured to transmit both notification message 752 and new rules data 751 together to each playback content server 520 eligible for new rules data 751.

Pub-sub mechanism 710 is also configured to publish new rules data 751 in rules database 720, when received from, for example, developer or programmer 701. It is noted that notification message 752 generally includes appropriate storage information for enabling playback content server 520 to fetch or otherwise receive new rules data 751 from rules database 720.

In some embodiments, the functionality of pub-sub mechanism 710 is included in a suitable stand-alone computing device. Alternatively, in some embodiments, the functionality of pub-sub mechanism 710 is included in one or more of content servers 110 and/or control servers 120.

Rules database 720 includes one more multiple storage devices or systems, including any suitable storage service in cloud services 130 that are configured to store new rules data 751. In addition, rules database 720 is configured to provide access to new rules data 751, so that playback content servers 520 of computing environment 700 can download new rules data 751 when notification message 752 is received.

Figure 8:
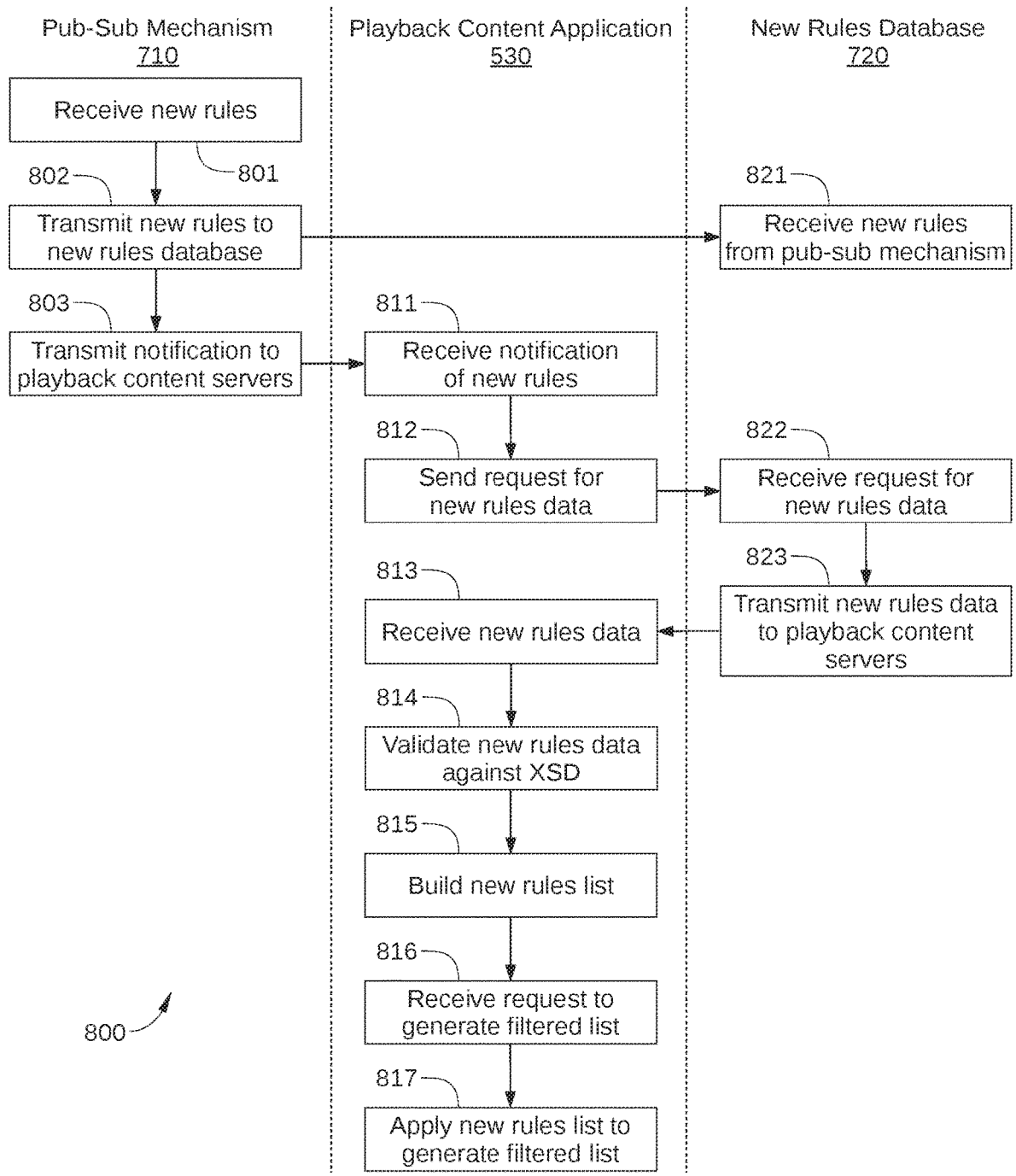
FIG. 8 sets forth a flowchart of method steps for dynamically modifying a rules engine implemented in a highly-scaled computing environment, according to various embodiments of the present invention.

FIG. 8 sets forth a flowchart of method steps for dynamically modifying a rules engine implemented in a highly-scaled computing environment, according to various embodiments of the present invention. Although the method steps are described with respect to the systems of FIGS. 1-7, persons skilled in the art will understand that any system configured to perform the method steps, in any order, falls within the scope of the present disclosure.

As shown, a method 800 begins at step 801, in which pub-sub mechanism 710 receives new rules data 751, for example from developer or programmer 701. In some embodiments, new rules data 751 are received as extensible markup language (XML) data in an XML file. In other embodiments, new rules data 751 are received via any encoding format suitable for transporting data. As noted above, new rules data 751 include one or more operations that are included in operations 732 and one or more dimensions that are included in dimensions 731. Further, new rules data 751 only include dimensions from the set of dimensions defined by dimensions 731 and only operations from the set of operations defined by operations 732.

In step 802, pub-sub mechanism 710 transmits new rules data 751 to new rules database 710 for storage, for example via an XML file.

In step 803, pub-sub mechanism 710 transmits notification message 752 to all subscribers to the topic affected by new rules data 751. That is, pub-sub mechanism 710 transmits notification message 752 to all playback content servers 520 on which rules engine 532 is executing.

In step 811, performed in response to pub-sub mechanism 710 transmitting notification message 752, playback content application 530 receives notification message 752 indicating that new rules data 751 are available.

In step 812, playback content application 530 sends a request 753 for new rules data 751 to new rules database 720.

In step 813, playback content application 530 receives new rules data 751 from new rules database 720. In some embodiments, new rules data 751 are received via an XML file.

In step 814, playback content application 530 validates new rules data 751 to confirm that new rules data 751, when implemented, adhere to a required structure. For example, in embodiments in which new rules data 751 are received by playback content server 520 as an XML file, playback content server 520 validates new rules data 751 against an XML Schema Definition, or XSD. In some embodiments, such an XSD is incorporated into rules engine 532 and/or playback content application 530.

In step 815, playback content application 530 builds a list of new rules, for example new rules list 734, based on new rules data 751. In some embodiments, rules engine 532 of playback content application 530 builds new rules list 734. New rules list 734 is based on the one or more operations and dimensions included in new rules data 751. Furthermore, new rules list 734 is configured to filter an extended list of entries (such as a list of available data streams associated with a particular video program included in a video content request 551) to generate a filtered list of entries (such as a list of data streams that are compatible with an endpoint device 115 associated with the video content request 551). In some embodiments, one or more values included in or derived from a video content request 551 (such as request metadata included in the video content request 551, expanded metadata 541, and/or stream metadata 542) correspond to one or more dimensions included in new rules list 734. In such embodiments, based on the one or more values included in or derived from the video content request 551, rules engine 532 can employ new rules list 734 to filter an extended list of entries to generate a filtered list of entries. It is noted that the functionality of new rules list 734 is implemented without recompiling the code for playback content application 530, playback manifest service 531, or rules engine 532.

In step 816, playback content application 530 stores new rules list 734. In some embodiments, playback content application 530 stores new rules list 734 locally in playback content server 520, as illustrated in FIG. 7. In other embodiments, new rules list 734 may be stored in rules database 720, or in any other technically feasible location for use by rules engine 532. It is noted that new rules list 734 replaces current rules list 733, since current rules list 733 reflects obsolete rules for determining compatible data streams. However, in some embodiments, current rules list 733 is stored as a backup rules list that can replace new rules list 734 if new rules list 734 results in unwanted errors or functionality. In such embodiments, current rules list 733 may be stored as an XML file locally, in rules database 720, or any other technically feasible location.

In step 817, playback content application 530 receives a request to generate a filtered list of entries from the extended list of entries, such as a video content request 551 from a particular endpoint device 115. The request generally includes one or more values (such as a device ID, a customer ID, a country ID, etc.) that each correspond to one or more dimensions that are included in dimensions 731.

In step 818, playback content application 530 applies new rules list 734 to an extended list of entries, such as the list of available data streams associated with the particular video program included in the video content request 551 received in step 817. Based on the one or more values included in the request to generate the filtered list of entries (such as the device ID, customer ID, country ID, etc. in a video content request 551) the rules included in new rules list 734 filter the extended list of entries to generate the requested filtered list of entries (such as a list of data streams that are compatible with the endpoint device 115 associated with a particular video content request 551).

In step 821, performed in response to pub-sub mechanism 710 transmitting new rules data 751, new rules database 720 receives and stores new rules data 751.

In step 822, performed in response to playback content application 530 sending request 753 for new rules data 751, new rules database 720 receives request 753.

In step 823, new rules database 720 transmits new rules data to playback content application 530.

In sum, techniques described herein enable modification of a rules engine employed in a highly-scaled computing environment. Specifically, a rules engine that is included in or called by an application or service executing on a plurality of servers or other computing devices is dynamically modified. Changes to the rules engine are implemented by transporting, as data, updated dimensions and/or operations that are employed by the rules engine to the many computing devices on which the application or service is running.

At least one advantage of the disclosed techniques is that a rules engine is dynamically modified without a restart of the associated service or application or a reboot of the server on which the application or server is executing. Thus, when the rules engine is employed in a highly-scaled computing environment, changes to the rules engine can be implemented quickly and uniformly on all affected server without recompiling code executing on the servers.

1. In some embodiments, a computer-implemented method comprises: receiving rules data that include a first operation, wherein the first operation is from a set of pre-defined operations and includes at least one dimension that is from a set of pre-defined dimensions; building a list of rules based on the rules data, wherein the list of rules filters an extended list of entries based on the first operation and on a first value that corresponds to the at least one dimension; receiving a request to generate a filtered list of entries, wherein the request references the first value; in response to receiving the request, applying the list of rules to the extended list of entries based on the first value to generate the filtered list of entries.

2. The method of clause 1, wherein the request to generate the filtered list includes request metadata, and the method further comprises determining additional metadata based on the request metadata.

3. The method of any of clauses 1-2, wherein the additional metadata include a second value that corresponds to another of the at least one dimensions included in the list of rules.

4. The method of any of clauses 1-3, wherein the request metadata includes a program identifier, and applying the list of rules to the extended list of entries comprises determining what data streams associated with the program identifier are compatible with an endpoint device associated with an endpoint device identifier.

5. The method of any of clauses 1-4, wherein the request metadata includes at least one of a customer identifier, a country identifier, and an endpoint device identifier.

6. The method of any of clauses 1-5, further comprising receiving a message indicating that the rules data are available for generating the filtered list.

7. The method of any of clauses 1-6, wherein the message is received via a publish-subscribe messaging pattern.

8. The method of any of clauses 1-7, further comprising requesting the rules data from a database referenced in the message.

9. The method of any of clauses 1-8, wherein the rules data only include operations from the set of pre-defined operations.

10. A non-transitory computer-readable storage medium including instructions that, when executed by a processor, cause the processor to perform the steps of: receiving rules data that include a first operation, wherein the first operation is from a set of pre-defined operations and includes at least one dimension that is from a set of pre-defined dimensions; building a list of rules based on the rules data, wherein the list of rules filters an extended list of entries based on the first operation and on a first value that corresponds to the at least one dimension; receiving a request to generate a filtered list of entries, wherein the request references the first value; in response to receiving the request, applying the list of rules to the extended list of entries based on the first value to generate the filtered list of entries.

11. The non-transitory computer-readable storage medium of claim 10, wherein receiving the request to generate the filtered list of entries comprises receiving a request for video content from an endpoint device in a network infrastructure.

12. The non-transitory computer-readable storage medium of any of clauses 10-11, further comprising transmitting the filtered list of entries to the endpoint device.

13. The non-transitory computer-readable storage medium of any of clauses 10-12, wherein the request to generate the filtered list includes a program identifier, the extended list of entries comprises a list of available data streams associated with the program identifier, and the filtered list of entries comprises a list of data streams that are compatible with an endpoint device associated with the request.

14. The non-transitory computer-readable storage medium of any of clauses 10-13, wherein the operations in the set of pre-defined operations only include dimensions from the set of pre-defined dimensions.

15. The non-transitory computer-readable storage medium of any of clauses 10-14, wherein the request to generate the filtered list includes request metadata, and the method further comprises determining additional metadata based on the request metadata.

16. The non-transitory computer-readable storage medium of any of clauses 10-14, wherein the additional metadata include a second value that corresponds to another of the at least one dimensions included in the list of rules.

17. The non-transitory computer-readable storage medium of any of clauses 10-16, wherein the request metadata includes a program identifier, and applying the list of rules to the extended list of entries comprises determining what data streams associated with the program identifier are compatible with an endpoint device associated with an endpoint device identifier.

18. The non-transitory computer-readable storage medium of any of clauses 10-17, wherein the request metadata includes at least one of a customer identifier, a country identifier, and an endpoint device identifier.

19. A system, comprising a memory storing a playback content application; and a processor that is coupled to the memory and, when executing playback content application, is configured to: receive rules data that include a first operation, wherein the first operation is from a set of pre-defined operations and includes at least one dimension that is from a set of pre-defined dimensions; build a list of rules based on the rules data, wherein the list of rules filters an extended list of entries based on the first operation and on a first value that corresponds to the at least one dimension;

receive a request to generate a filtered list of entries, wherein the request references the first value; in response to receiving the request, apply the list of rules to the extended list of entries based on the first value to generate the filtered list of entries.

20. The system of clause 19, wherein receiving the request to generate the filtered list of entries comprises receiving a request for video content from an endpoint device in a network infrastructure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A computer-implemented method for modifying a rules engine in a scaled computing environment, comprising:
receiving, by a playback content application, a first computer-readable file that includes rules data specifying a first operation that has at least one dimension;
building a list of rules for the rules engine based on the rules data;
receiving, by the playback content application and from a first endpoint device, a request to generate a filtered list of entries, wherein the request references a first value corresponding to the at least one dimension; and
in response to receiving the request, applying the list of rules to an extended list of entries based on the first value to generate the filtered list of entries.

2. The computer-implemented method of claim 1, wherein the list of rules filters the extended list of entries based on the first operation and the first value.

3. The computer-implemented method of claim 1, wherein the first computer-readable file is received from either a rules database or a publication mechanism.

4. The computer-implemented method of claim 1, wherein the at least one dimension is included in a set of pre-defined dimensions.

5. The computer-implemented method of claim 1, wherein the first operation is included in a set of pre-defined operations.

6. The computer-implemented method of claim 1, wherein the request to generate the filtered list of entries includes request metadata, and further comprising determining additional metadata based on the request metadata.

7. The computer-implemented method of claim 6, wherein the additional metadata includes a second value that corresponds to another dimension included in a set of pre-defined dimensions.

8. The computer-implemented method of claim 6, wherein the request metadata includes a program identifier, and applying the list of rules to the extended list of entries comprises determining at least one data stream associated with the program identifier that is compatible with an endpoint device associated with an endpoint device identifier.

9. The computer-implemented method of claim 6, wherein the request metadata includes at least one of a customer identifier, a country identifier, or an endpoint device identifier.

10. The computer-implemented method of claim 1, further comprising receiving a message indicating that the rules data is available, and, in response, requesting the rules data from a database referenced in the message.

11. One or more non-transitory computer-readable storage media including instructions that, when executed by one or more processors, cause the one or more processors to perform the steps of:
receiving rules data specifying at least one dimension;
building a list of rules for a rules engine based on the rules data;
receiving a request to generate a filtered list of entries, wherein the request references a first value corresponding to the at least one dimension; and
in response to receiving the request, applying the list of rules to an extended list of entries based on the first value to generate the filtered list of entries.

12. The one or more non-transitory computer-readable storage media of claim 11, wherein:
the rules data further specifies a first operation that has the at least one dimension; and
the list of rules filters the extended list of entries based on the first operation and the first value.

13. The one or more non-transitory computer-readable storage media of claim 11, wherein:
the rules data is received via a first computer-readable file; and
the first computer-readable file is received from either a rules database or a publication mechanism.

14. The one or more non-transitory computer-readable storage media of claim 11, wherein the at least one dimension is included in a set of pre-defined dimensions.

15. The one or more non-transitory computer-readable storage media of claim 11, wherein:
the rules data further specifies a first operation that has the at least one dimension; and
the first operation is included in a set of pre-defined operations.

16. The one or more non-transitory computer-readable storage media of claim 11, wherein the request to generate the filtered list of entries includes request metadata, and further comprising determining additional metadata based on the request metadata.

17. The one or more non-transitory computer-readable storage media of claim 16, wherein the additional metadata includes a second value that corresponds to another dimension included in a set of pre-defined dimensions.

18. The one or more non-transitory computer-readable storage media of claim 16, wherein the request metadata includes a program identifier, and applying the list of rules to the extended list of entries comprises determining at least one data stream associated with the program identifier that is compatible with an endpoint device associated with an endpoint device identifier.

19. The one or more non-transitory computer-readable storage media of claim 16, wherein the request metadata includes at least one of a customer identifier, a country identifier, or an endpoint device identifier.

20. The one or more non-transitory computer-readable storage media of claim 11, further comprising receiving a message indicating that the rules data is available, and, in response, requesting the rules data from a database referenced in the message.

21. The system of claim 11, wherein the request to generate the filtered list of entries includes request metadata, and the one or more processors further determine additional metadata based on the request metadata.

22. The system of claim 21, wherein:
the request to generate the filtered list of entries references a first value corresponding to the at least one dimension; and
the additional metadata includes a second value that corresponds to another dimension included in a set of pre-defined dimensions.

23. The system of claim 21, wherein the request metadata includes a program identifier, and the one or more processors apply the list of rules to the extended list of entries by determining at least one data stream associated with the program identifier that is compatible with an endpoint device associated with an endpoint device identifier.

24. The system of claim 21, wherein the request metadata includes at least one of a customer identifier, a country identifier, or an endpoint device identifier.

25. A system, comprising:
one or more memories storing instructions; and
one or more processors that are coupled to the one or more memories and,
when executing the instructions, are configured to modify a rules engine in a scaled computing environment by:
receiving rules data specifying at least one dimension;
building a list of rules for the rules engine based on the rules data;
receiving from a first endpoint device, a request to generate a filtered list of entries; and
in response to receiving the request, applying the list of rules to an extended list of entries to generate the filtered list of entries.

26. The system of claim 25, wherein:
the rules data further specifies a first operation that has the at least one dimension; and
the list of rules filters the extended list of entries based on the first operation and the first value.

27. The system of claim 25, wherein:
the rules data is received via a first computer-readable file; and
the one or more processors received the first computer-readable file from either a rules database or a publication mechanism.

28. The system of claim 25, wherein the at least one dimension is included in a set of pre-defined dimensions.

29. The system of claim 25, wherein:
the rules data further specifies a first operation that has the at least one dimension; and
the first operation is included in a set of pre-defined operations.

30. The system of claim 25, wherein the one or more processors receive a message indicating that the rules data is available, and, in response, request the rules data from a database referenced in the message.

\* \* \* \* \*

UNITED STATES PATENT AND TRADEMARK OFFICE
CERTIFICATE OF CORRECTION

| | | |
|---|---|---|
| PATENT NO. | : 11,025,695 B2 | Page 1 of 1 |
| APPLICATION NO. | : 16/901923 | |
| DATED | : June 1, 2021 | |
| INVENTOR(S) | : Haley Tucker | |

It is certified that error appears in the above-identified patent and that said Letters Patent is hereby corrected as shown below:

In the Claims

Column 20, Claim 25, Line 43, please delete "from a first endpoint device,".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*